May 29, 1962 S. NATELSON 3,036,893
AUTOMATIC CHEMICAL ANALYZER
Filed March 14, 1960 5 Sheets-Sheet 1

Fig.1

SAMUEL NATELSON
INVENTOR.

BY
ATTORNEY

May 29, 1962  S. NATELSON  3,036,893
AUTOMATIC CHEMICAL ANALYZER
Filed March 14, 1960  5 Sheets-Sheet 2

Fig. 2

SAMUEL NATELSON
INVENTOR.

BY George B. Quijoro

ATTORNEY

May 29, 1962 S. NATELSON 3,036,893
AUTOMATIC CHEMICAL ANALYZER
Filed March 14, 1960 5 Sheets-Sheet 3

Fig. 3

SAMUEL NATELSON
INVENTOR.

BY George B. Aujero

ATTORNEY

May 29, 1962  S. NATELSON  3,036,893
AUTOMATIC CHEMICAL ANALYZER
Filed March 14, 1960  5 Sheets-Sheet 4

Fig. 4

SAMUEL NATELSON
INVENTOR.

BY George B. Aujero

ATTORNEY

United States Patent Office 3,036,893
Patented May 29, 1962

3,036,893
AUTOMATIC CHEMICAL ANALYZER
Samuel Natelson, Brooklyn, N.Y., assignor to Scientific Industries, Inc., Springfield, Mass.
Filed Mar. 14, 1960, Ser. No. 14,894
16 Claims. (Cl. 23—230)

This invention relates to the chemical analysis of substances, and more particularly to a method and apparatus for the automatic continuous analysis of substances.

The chemical laboratory is often faced with the problem of the analysis of large numbers of samples. This is time consuming and tedious to the operator, often resulting in error due to the large number of samples being assayed and the close attention one must pay to each step of the procedure. The fatigue which sets in often results in errors being introduced. In many cases, several operators are required to finish the work of the day.

To relieve this condition, instruments have been introduced which automatically sample the material to be analyzed, add reagents, and go through elaborate processes both as regards procedure and instrumentation to perform the analyses automatically. These devices are cumbersome, elaborate and are expensive to produce. Thus, only certain laboratories can afford the expense of these instruments. In addition, the operator must be skilled in handling the equipment as regards setting up the instrument and adjusting it when something goes wrong. These present instruments require appreciable amounts of material for analysis and do not lend themselves readily to adaptation for the analysis of ultramicro samples of the order of microliters. Furthermore, in the instruments presently used, the sample and reagents are pumped in the instrument in liquid form so that an appreciable quantity of sample is needed.

Although attempts were made to overcome the foregoing difficulties and other difficulties and disadvantages, none, as far as I am aware was entirely successful when carried into practice commercially.

It is therefore an object of the present invention to provide a device which does not require liquid reagents.

Another object of the invention is to provide a device which is easy to operate.

Still another object of the invention is to provide a device which permits multiple analysis of several constituents simultaneously.

This invention also contemplates providing a device which is inexpensive to manufacture.

It is also the purpose of the invention to provide a which can handle ultramicro samples.

The invention likewise contemplates providing a device which is rapid and capable of turning out a result in as short a time as twenty seconds or even less, once the instrument has started to run.

Yet another object of the invention is to provide a device which is versatile, without changing to elaborate equipment during intermediate stages of the operation.

Furthermore, the invention contemplates providing a device which is reliable, having a minimum number of easily repairable parts.

Among the further objects of the present invention is the provision of a device which can do highly colored solutions, e.g., hemoglobin, when the color does not readily pass through a membrane.

With the foregoing and other objects in view, the invention resides in the novel arrangement and combination of parts, in the details of construction, and in the process steps hereinafter described and claimed, it being understood that changes in the precise embodiment of the invention herein disclosed may be made within the scope of what is claimed without departing from the spirit of the invention.

The invention will appear more clearly from the following detailed description when taken in connection with the accompanying drawing, showing by way of example, preferred embodiments of the inventive idea.

The invention in its broader aspects contemplates an automatic apparatus for the continuous analysis of substances which are in a dispenser adapted to aspirate, drop, or blow a sample of the substance on the apparatus. Generally speaking, the apparatus is adapted to process a first moving tape for receiving the sample; a moving test tape to which the sample will be transferred and upon which tape said sample or samples will be subjected to treatment for analysis; and a moving intermediate porous tape through which the sample to be analyzed will have to pass in order to reach the test tape. To this end, the apparatus 10 provides an input zone 11 where the sample is placed on a sample receiving tape; a transfer and reaction zone 12 where the sample is transferred from the sample receiving tape to the test tape, through the intermediate tape; a tape separation zone 13 where means are provided for the separation of the various tapes, this zone usually includes take up means to take up the sample receiving tape and the intermediate tape; a treating zone 14 where the test tape is subjected to treatment for analyzing the sample; a reading zone 15, where the treated tape is read; and, a terminal zone 16 where the test tape is taken up. Driving means are also provided to drive the tapes either at a constant rate or intermittently.

The reason for using a plurality of tapes will become apparent in connection with the explanation of the operation of the device given after the following detailed description of the apparatus.

Figure 5:
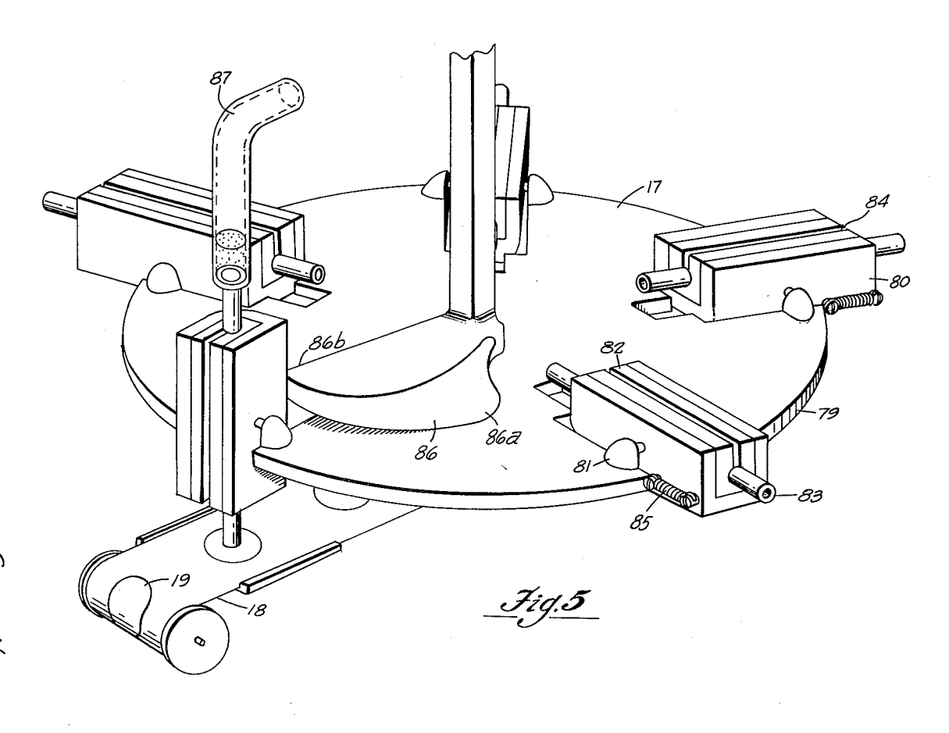

The samples to be tested or analyzed are contained in a dispenser 17, a preferred embodiment of which is depicted in FIG. 5 of the drawing. The principal requirement of the dispenser is that it can either drop or blow small measured quantities of the sample at a desired place on the apparatus.

In accordance with one embodiment of the invention, the sample from the dispenser 17 will be received on a sample receiving tape 18. Advantageously, this tape will have been pretreated so that the dropping of the sample on the tape will form confined spots 19. Confined spots are formed by forming rings of water repellent material, e.g., wax or plastic on filter paper. When a sample is dropped in such a ring, the spot formed by the sample will be confined to the area inside the ring, and, uniformity of the spot is thus obtained.

The sample receiving tape 18 is usually contained on a payoff, e.g., sample receiving tape payoff roller 20. For convenience, no supporting means are shown for any of the numerous rollers or reels herein described, it being of course well understood that such supporting means are provided.

To receive the sample, there is provided a sample receiving plate 28, having guide means 29, and it is towards this sample receiving plate 28 that the sample from dispenser 17 will be directed, e.g., blown, dropped or aspirated. In order to avoid any contamination of the sample which will be placed on the sample receiving tape, a horseshoe shaped recess 30 may be provided in the sampling plate at the spot where the sample is placed on the tape. Thus, in this embodiment, the plate serves only as a support, and the sample itself never touches the plate. To further insure accuracy in the placing of the sample on the tape, a sample receiving tape idler roller 31 may be provided. This will prevent the tape from having any crimps or bumps and aids in the uniformity of the sample spot placed on the tape.

As illustrated in the drawing, at this portion of the apparatus, the sample receiving tape travels backwards, i.e., counter to the direction of travel of the other tapes. After passing the station where the sample receiving plate is located, the sample receiving tape 18 goes over a reversing roller 31a which will place the confined spot and sample thereon face down. As the confined spot 19 with a sample thereon has a tendency to bulge at the center, this reversal of the tape, i.e., having the confined spot which received the sample in a face up position turned around to a face down position, will greatly facilitate the eventual transfer of the sample placed on the sample receiving tape 18 to a test tape 21. When advantageous to the tests being conducted, this test tape 21 may also contain a reagent. Test tape 21 also comes on a payoff, e.g., test tape payoff roller 22. Sandwiched in between the sample receiving tape 18 and the test tape 21 is an intermediate tape 23. This tape must be porous, the degree of porosity will depend on the sample tested and on the treatment to which the sample is subjected. For proteins, total lipids, mucoproteins etc. where larger molecules are being assayed, the porosity of the tape must be increased to allow these molecules to go through. Likewise, the degree of porosity of the tape may also be used as an effective means for separating components of the samples being tested.

The intermediate tape payoff means, e.g., roller 24 is located in a water tank 25 having sufficient water 25a to keep the intermediate tape wet or fairly moist. In this connection, an intermediate tape made of cellophane has been found particularly useful for certain hospital laboratory analysis, e.g., sugar, urea, calcium, uric acid, creatinine, and amino acids where it is desired to prevent proteins from reaching the test tape.

These three tapes, i.e., the sample receiving tape 18, the intermediate tape 23, and the test tape 21 are all directed towards a pair of spring loaded rollers 27 located at the entrance of the transfer and reaction zone 12. The function of these rollers is to bring the three tapes into close contact so that the sample can be transferred from the sample receiving tape to the test tape through the intermediate tape. Just as the sample receiving plate 28 and roller 31a have recesses so as to avoid contamination of the sample, so do the spring loaded rollers 27 likewise have a recess 32. This principle of recessed parts may be carried out throughout the apparatus of this particular embodiment.

The tapes now enter a transfer and treating zone 12 which is completely enclosed in enclosure 33, preferably made of transparent plastic, and advantageously having a door 34. This door is to facilitate adjustment or repairs and can be a simple affair held by hinges 35. Naturally the entire enclosure need not be transparent, just so long as the operator can see what goes on inside the enclosure and make certain that the device is functioning properly. Inside the transfer zone is a fairly large drum 36. The bottom portion of the enclosure 33 has continuously flowing water 38 which keeps the drum wet. A circulating pump 39 is provided to keep the water moving, and, a sponge or sponges 40 are provided to aid in washing and wetting the drum. It is while moving through this zone that the material to be tested is transferred from the sample receiving tape to the test tape through the intermediate tape. At the transfer zone exit, there may be provided an idler 41 to facilitate the passage of the tapes out of the zone. From the transfer zone 12, the tapes pass to the tape separation zone 13. Since this is the end of the line for two of the tapes, driving means are provided in this zone. These driving means may be either belting, or a driving motor 42 through which the tapes pass. A separate switch may be provided for this motor if desired. The motor may drive one of the loaded rollers 43 by a gear 45 and a pinion 46 or other driving means may be used. Thus, at this stage, the sample receiving tape is wound on sample receiving tape takeup roller 47 and the intermediate tape is wound on a corresponding roller 48. Both of these rollers are depicted in the drawing as belt driven, i.e., belt 49 drives the sample receiving tape takeup reel and belt 50 the intermediate tape takeup roller. The test tape however is not taken up at this stage but passes on to treating zone 14 through treating zone entrance rollers 51 having the usual recesses 52. The treating zone illustrated in the drawing comprises a chamber 53 in which there is provided heating means 54. Advantageously, a thermometer 55 may also be provided in chamber 53 which of course is preferably transparent, or partially so. To increase the travel time in this zone, the construction of the chamber may be elongated and may have one or more idlers 56 to change the course of travel of the test tape through the zone. Additional equipment may also be provided in this zone, either in the chamber as shown in the drawing, such as a fan 57 and air vents 58 all of which of course may be adjustable. In designing the equipment, the idler rollers 56 in the zone may be removable and so disposed that the addition or removal of these rollers in the zone fixes the travel time in the zone each particular disposition of these rollers in the zone causing the tape to travel in the zone a predetermined time period. It has also been found particularly useful to have a washing station in the zone adapted to wash the excess reagent or sample from the test tape. This is a simple affair and may comprise a water tank with guide rollers guiding the tape in and out of the tank. The tank may of course have either a pump or spraying means or both. The test tape 21 leaves the treating zone along an idler 59 at zone exit 60. The test tape now enters the reading zone 15 where the results of the test or analysis will be read on a densitometer 61. An appropriate light filter 62 acting in combination with a light source 63 is on one side of the tape, and a photo cell 64 is on the other side. The action of the light on the densitometer will be plotted on graph paper 65 which shows the peaks 66 made by pen 67. This type of densitometer 61 is known in the art.

The test tape has now served its purpose and has come to the end of its road. It therefore enters terminal zone 16 which comprises a pair of spring loaded takeup means 68 preferably driven by gearing 69 from a motor 70 operated by a switch 71 although of course other drive, e.g., belting may be used. The test tape finally winds up on takeup reel 72 shown in the drawing as being rotated by belting 73. The drive for the device should be such that by proper adjustment, it should be both continuously driving the rollers or intermittently driving the rollers. Usually, when the sample from dispenser 17 is being dropped on the sample receiving tape over the sample receiving plate, or even when blown or dropped thereon by the operator, the tapes are moving at the intermittent rate, allowing the sample to drop on the tape while the tape is not moving. However, after one or a series of samples have been dropped, the operator may wish to move the tape along for some distance before starting a new series of tests with other samples. It is thus preferable for the operator to be able to advance the tape continuously by pressing a button or switch which will change the intermittent drive to continuous drive.

Figure 4:
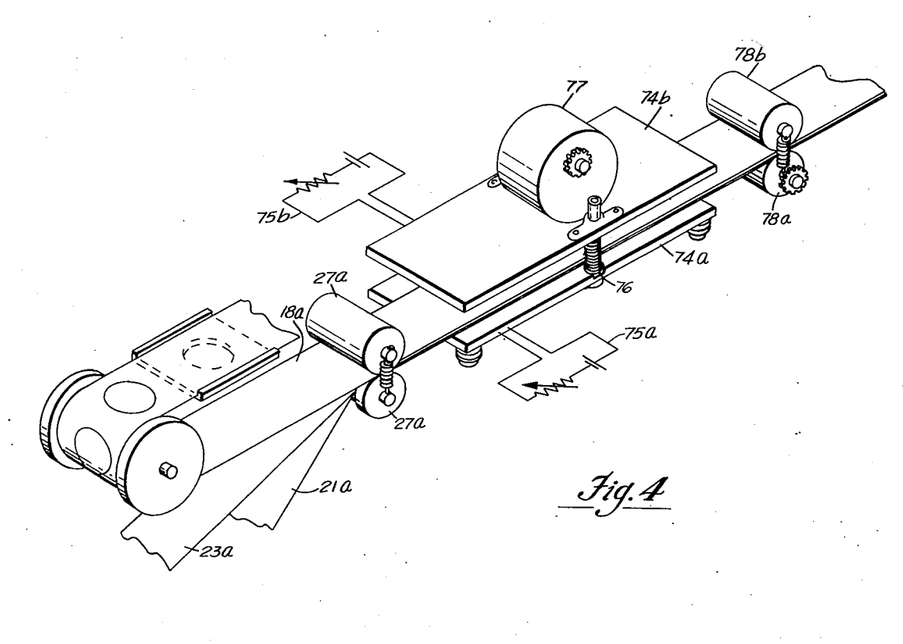
FIG. 4 is a longitudinal view of another embodiment of a portion of the apparatus depicted in FIG. 1; and, FIG. 5 is a perspective view of an embodiment of a sample dispenser which may be advantageously used with the apparatus depicted in FIGS. 1 and 4.

For certain tests, a simpler type of transfer and reaction zone may be used as shown in FIG. 4. With this particular embodiment, it is preferable to use a special type of sample receiving tape and test tape. This sample receiving tape 18a and test tape have an undercoating of plastic, e.g., polyethylene. This is readily done merely by spraying the tape. By undercoating of course is meant a coating on the side opposite to the side where there are rings for the confined spots in the sample receiving tape and on one side only of the test tape. Since this undercoating will prevent contamination of the sample, recessed plates, rollers and other elements are not required. Furthermore, a tape having the undercoating described will have a greatly increased wet strength. As previously, the three tapes, i.e., sample receiving tape 18a, test tape 21a and intermediate tape 23a are directed towards spring loaded rollers 27a located at the entrance of transfer and reaction zone 12a. No recesses are provided since a polyethylene backed tape is used. The transfer and reaction zone in this embodiment comprises a pair of opposed flat plates 74a and 74b. Preferably, heating means 75a and 75b may be provided to heat each plate. Spring means 76 tend to keep the plates apart, and an eccentric roller 77 periodically presses down on the three tapes and the top plate. At the end of the zone, rollers 78a and 78b may either guide or pull the tapes into the tape separation zone. In connection with this embodiment, the preferred means for backing the tape is with polyethylene. However, extreme heat cannot be used in either of the zones because of the polyethylene. Thus, although this second embodiment has the advantage of being simpler and more compact than the first embodiment described, it requires a special tape which may not work as well under heat above that at which the plastic softens as the first embodiment.

In connection with the devices just described, it is advantageous to have associated therewith a sample dispenser 17, preferably driven by the same driving means as are used to drive the device. The dispenser should be releasable or detachable from the device to permit manually feeding the sample receiving tape. The dispenser includes circular positioning means 79 on which a plurality of holders 80 are mounted near the edge of the positioning means by pivot means 81. In each holder 80, there is provided a bed 82 made of rubber or other resilient material into which a capillary tube 83 is inserted through a slit 84. Spring means 85 keep the beds with the tubes therein in the horizontal position. At one point over the positioning means an adjustable cam 86 is provided. This cam is not fastened to the positioning means, but to the frame of the dispenser which is not shown in the drawing. One end 86a of the cam will engage one of the tube holders 80 as it comes around on the positioning means and gradually force it and the tube inside to a vertical position as the tube holder reaches the cam other end 86b. It is under this point on the cam that the sample receiving tape 18 with the confined spots 19 passes. Over this point in the device there is provided air pressure means 87 which will blow on the capillary tube and force the sample onto the sample receiving tape confined spot. This air pressure means is lifted as the capillary moves into position and lowers to touch the capillary when air pressure is applied. A porous rubber sheet covering the air outlet permits contact with the capillary without danger of breaking it. In one variation, a vacuum is applied by a similar tube underneath the sample receiving tape and aspirating air through the paper causes the sample to adhere to the paper. In practice, circular positioning means capable of holding fifty capillaries can be constructed. When the capillary tubes have been inserted in the horizontal position they can be rapidly filled by simply touching the sample to the tip of the capillary. It then runs right to the other end of the tube. For most tests, capillary tubes of between 0.2 to 0.5 mm. bore and capable of containing from 0.01 to 0.05 ml. are preferable. But, in some cases, capillary tubes of less than 0.1 mm. bore are used.

Although the foregoing explanation is sufficient to understand the operation of the components of the devices herein contemplated, it is believed that additional explanation is required to clarify the reason for using the components described, particularly the combination of the three separate tapes. Since assuredly there is no reason to use three tapes if one could do the job. As already explained at the beginning of this patent specification, tape devices, particularly where paper tapes are employed have heretofore not been considered suitable for quantitative chemical analysis of substances. This is because of the irregular spot formation. Obviously, the reading means, e.g., densitometer 61 has no way of distinguishing between even and uneven spots. Furthermore, if the components of the sample drop or specimen are not properly or uniformly distributed, visual study of the curves and peaks recorded by the densitometer is impossible. If two spots containing the same components are distributed over an equal area but in a different manner, the densitometer recording device will record two different curves. The areas of each curve will be precisely the same, but the peak height of one curve will be different from the other. Electronically, both spots can be read properly and correct results obtained, but visual comparison is of course impossible.

The need for the three separate tapes can be understood from the following observation. When a drop of water is dropped on a piece of paper which has been impregnated with a colored reagent which is water soluble, the water will spread. In so doing, it will dissolve the reagent and move it away from the center where the water has been dropped. On drying, a ring will be observed. The center of the ring will be white, where the reagent has been washed away. The outer ring will be dark where the reagent has been concentrated. For this reason, it is impractical to perform a quantitative test by dropping a test solution on a reagent paper. If attempted, one would obtain a thin ring surrounding the area of application. When sent through a densitometer, the densitometer will read in error. The center of the spot will allow too much light to go through since it is clear. The ring concentration will be underestimated since light will not pass the high concentration of color in the ring. Thus, whether there is a certain amount or whether there is twice that amount in the ring, the maximum absorption of light will have been reached and the amount will be underestimated. When the sample is applied through a porous tape with minute pores, submicroscopic droplets of test solution are evenly distributed over the reagent paper. This results in an even distribution of reagent and test solution. The colored product of such a reaction, after drying can be accurately estimated by the densitometer.

The need for confined spots can be understood from the following observations: When samples containing 20 µl. of human blood serum and water are placed on a paper tape, the serum will spread normally to about 17 mm. and the water to about 20 mm. For this reason, aqueous solutions cannot be compared with serum. The same quantity of serum or water can be confined in a confined spot circle of about 15 mm. diameter. The 15 mm. spot keeps them spread equally and distributes their contents over an equal area when they are allowed to evaporate. When the water contains a measured amount of sugar, the sugar content of the serum can be compared with the sugar content of the water. The confining circles can be made of wax, polyethylene, glyptal resin, urea formaldehyde resin, C-oil polymer or other suitable plastic that is hydrophobic.

In view of the foregoing, three tapes are provided in the present instrument. The first tape is absorbent and has confined spots. To prevent the spot from bulging after the sample has been placed thereon, or to direct the effect of any bulge properly, the tape is reversed, i.e., the top side where the sample has been placed is placed on the bottom. This tape has been termed herein the sample receiving tape. Next there is a porous tape with a multiplicity of microscopic to submicroscopic holes through which the samples from the confined spots is passed. Last, is the tape containing the reagent on which the sample makes a multiplicity of small spots which to the eye and densitometer appear as one even spot. Attention is directed to the fact that as used herein, the term porous or porosity refers to porous or porosity for the purposes herein stated, the degree of porosity varying according to the test to be performed. The rendering of a cellophane tape more porous is simple. The subjecting of a cellophane tape to the action of a spark discharge will produce an excellent intermediate tape useful for those tests where larger molecules are being analyzed. For small molecules the untreated cellophane or thin parchment is used.

For the purpose of giving those skilled in the art a better understanding of the invention, the following illustrative examples are given:

GENERAL PROCEDURE USED

Twenty microliters of the sample mentioned, e.g., blood serum or blood were added to the confined spot. This is done either by blowing the sample from an ultramicro pipet and touching it to the spot or from an automatic device as shown in the drawing. The instrument is started and travels a short distance, about 1½ inches and stops. A second sample is then blown or dropped on the spot. This continues until all the samples have been added. The instrument continues to move until the test strip emerges with the samples thereon which have moved through the intermediate tape and been processed and spots are read.

TAPE CONSTRUCTION

The top tape is made of paper in some tests and cotton cloth in others, about 1½ inches wide. The top tape is also backed with polyethylene by spraying in some tests. The center tape is made of cellophane of approximately $\frac{1}{1,000}$ inch thickness. This was untreated and in this condition, permits smaller molecules such as water, sugar and salts to pass through, but not macro-molecules such as protein. To pass larger molecules such as proteins, the center tape may be perforated cellophane or a closely woven nylon cloth. The bottom tape was made of paper 1½ inches wide backed with a layer of polyethylene to give it wet strength. Other tapes tested as the bottom test tape were paper tapes with cotton thread woven in them and paper tapes impregnated with plastic on both edges of the paper to a distance of ¼ inch, leaving the center inch untouched. All were found satisfactory. A closely woven cloth made of cotton was also tried and found satisfactory as the test tape.

Example I

GLUCOSE IN BLOOD SERUM (ENZYMATICALLY)

Figure 1:
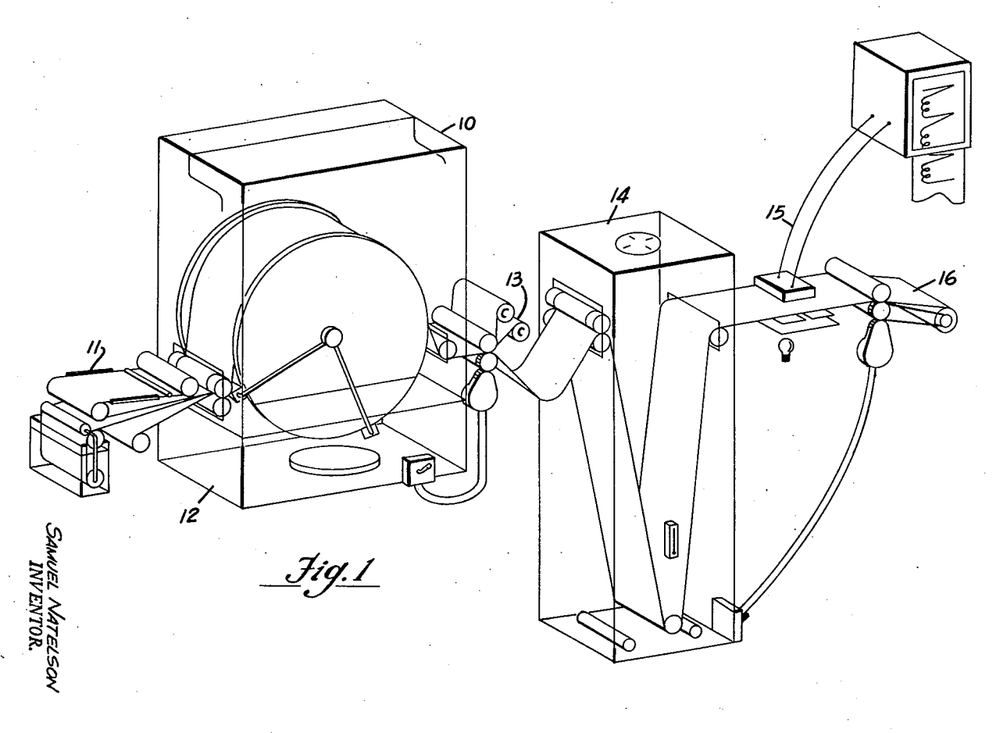
FIG. 1 is a longitudinal view of one embodiment of the apparatus contemplated herein.
Figure 2:
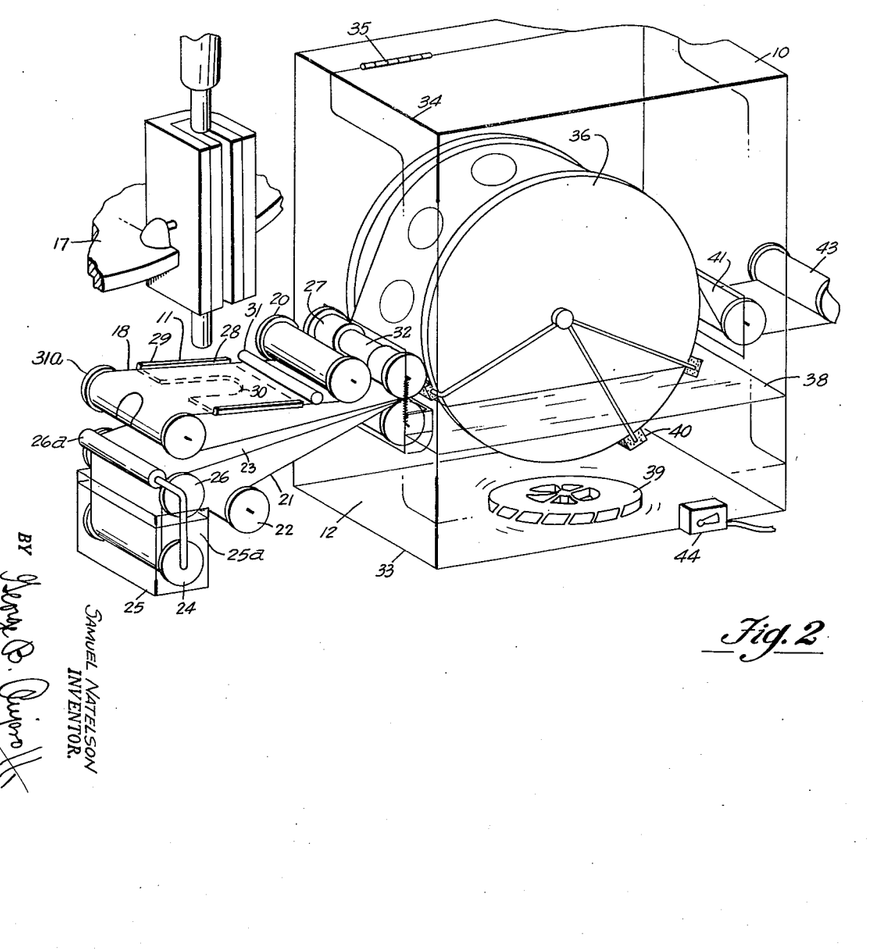
FIG. 2 is an enlarged view of the left hand portion of the apparatus depicted in FIG. 1.
Figure 3:
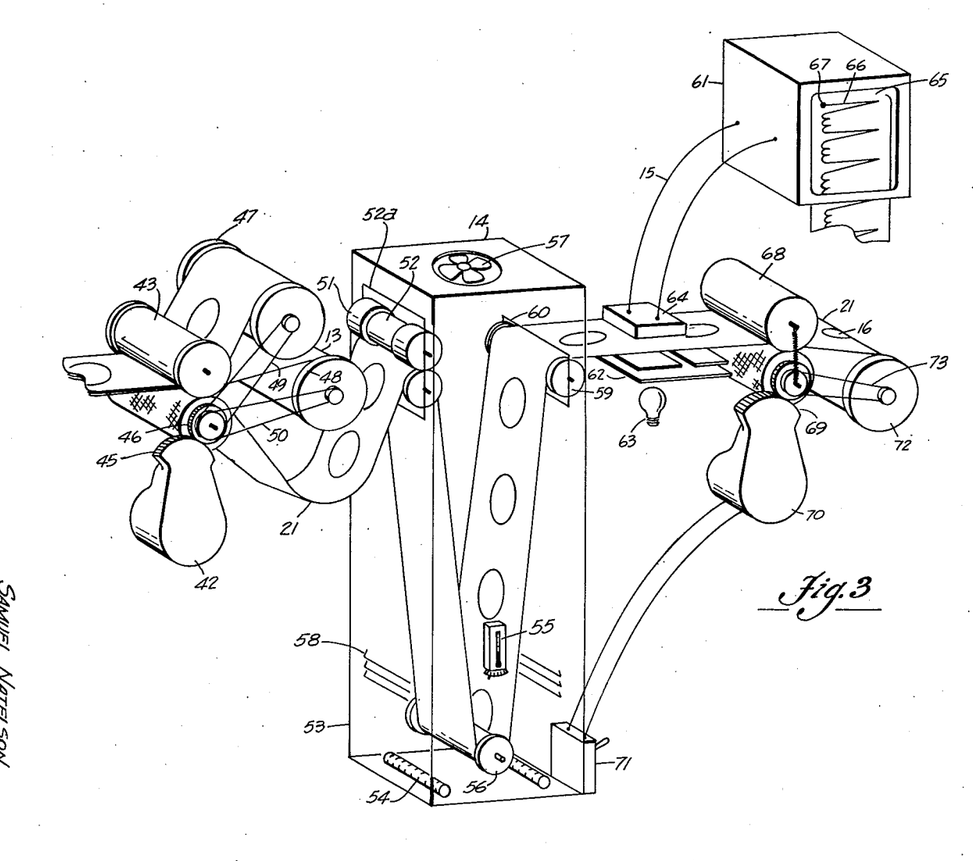
FIG. 3 is an enlarged view of the right hand portion of the apparatus depicted in FIG. 1.

To 200 ml. of N/20 phosphate buffer, pH 7 add 10 mg. of horseradish peroxidase and 250 m. of glucose oxidase. Shake until dissolved. Now add 1 ml. of a 16% o-dianisidine solution in water and mix. Filter this solution and impregnate the test paper with it. Air dry the paper. Add 0.01 ml. of human blood serum to the paper with the confined spots from the automatic feeding device of FIG. 5 or from an ultramicro pipet. The center tape in this case is untreated cellophane, premoistened, as shown in FIG. 1. The transfer and reaction zone is maintained at a temperature of 37° C. in this case. Contact time in the chamber between tapes is ten minutes. The test tape, i.e., the reagent paper tape which now bears a pink stain is dried in the treating zone at 70° C. The filter used in the densitometer has a transmission maximum of 395 m$\mu$. The height of the peaks on the recording chart are a measure of the glucose concentartion. Since the large drum in the transfer and treating zone, i.e., drum 36 carries 20 spots, a determination will be available every 30 seconds.

Example II

GLUCOSE IN BLOOD SERUM (BY CHEMICAL MEANS)

A 1% solution of potassium ferricyanide is acidified to a pH of 3 with dilute sulfuric acid. The test paper is dipped in this solution and air dried. Serum (0.02 ml.) is added to the confined spots and the procedure followed as in Example II, using cellophane as the intermediate tape. Reaction time is ten minutes at 37°. The filter used in the densitometer is 540 m$\mu$ filter. The drying oven in the treating zone in this case is heated at 85° C. to develop a blue color.

Example III

AMINO NITROGEN IN SERUM

A solution is prepared of 20 mg. of ninhydrin and 10 mg. of hydrindantin dissolved in 100 ml. of ethyl alcohol. To this solution is added 2 ml. of collidine and 2 ml. of glacial acetic acid. The reagent is sprayed on the reagent paper, i.e., test tape, which is then allowed to air dry. 0.02 ml. of serum is added to the confined spot paper. The central tape is cellophane as in Example II. Reaction time is 15 minutes in the chamber of the transfer and reaction zone and the paper is dried at 75° C. in the drying oven. The purple color develops in the drying oven of the treating zone. The filter in the densitometer is 520 m$\mu$ filter. The peak heights on the recording chart or the areas under the curves produced are a measure of the concentration of amino nitrogen in the serum.

Example IV

CALCIUM IN SERUM

An aqueous solution of murexide is prepared in a 0.1 N solution of sodium carbonate or trisodium phosphate. The reagent paper, ie., test tape is dipped into this solution and evaporated to dryness in a nitrogen atmosphere at 50° C. 0.02 ml. of serum is added to the confined spot paper, i.e., sample receiving tape. The center tape is cellophane as in the above examples. Reaction time is ten minutes. The drying chamber of the treating zone is at 60° C. The color developed is read with a 540 m$\mu$ filter in the densitometer. Alizarin may be used in place of the murexide in which case a 560 m$\mu$ light filter is used in the densitometer.

Example V

MAGNESIUM IN BLOOD SERUM 75 mg. of Titan Yellow is dissolved in 2000 ml. of a 0.1% solution of polyvinyl alcohol. 10 grams of potassium carbonate is dissolved in this solution. The reagent paper is sprayed with this solution and allowed to dry. 0.05 ml. of serum is added to the confined spot. The center tape is cellophane. A 560 m$\mu$ filter is used in the densitometer. Reaction time is ten minutes and the reagent tape is dried at 60° C.

Example VI

PROTEIN IN BLOOD SERUM 1 gram of Ponceau 2R dye is dissolved in one liter of water containing 1 ml. of glacial acetic acid. The reagent paper, i.e., test tape is soaked in the solution and allowed to dry. 0.01 ml. of serum is added to the confined spot. The center tape is of a porosity as obtained with finely woven nylon or cellophane which has been perforated with electrical sparks so as to let the whole serum through in a large number of fine droplets to the test tape. Reaction time is ten minutes at room temperature. Prior to passage through the dryer in the treating zone, the reagent paper test tape is allowed to run through a washing station where there is a solution of 10% acetic acid in water or a 0.1% solution of acetic acid in ethyl alcohol. This washes off the excess Ponceau 2R dye and leaves only the spots stained where the protein has come through the center tape. Passage through this wash solution is 15 minutes. The reagent paper test tape is now passed through the dryer in the treating zone at 70° C. and the spots read by the densitometer at 540 mμ. Other dyes which stain protein such as amido-black may be substituted for the Ponceau 2R.

*Example VII*

TOTAL LIPIDS OF SERUM 1 gram of oil red O dye is allowed to saturate 1 liter of 50% ethyl alcohol. The reagent paper is soaked in the dye solution and allowed to air dry. 0.01 ml. of serum is added to the confined spot. The center tape is perforated cellophane or perforated polyethylene or finely woven nylon. The chamber in the transfer and reaction zone is maintained at 55° C. for 20 minutes. The excess dye is washed off the test tape reagent paper by passing this tape through a 50% aqueous solution of isopropyl alcohol maintained at a temperature of 50° C. with a washing time of twenty minutes. The test tape reagent paper is now dried in the drying oven. The stained lipids are read on the densitometer with a 540 mμ light filter. Other dyes such as Sudan black may be used to stain the lipids.

*Example VIII*

RADIOACTIVE INORGANIC IODINE IN BLOOD

The reagent paper test tape is unstained. 0.01 ml. of blood is added to the confined spot. The center tape is untreated cellophane. The reaction time at room temperature is ten minutes and the drying temperature 70° C. for ten minutes. The reagent test tape is passed over a scintillation counter attached to a commercial recording device to integrate the counts and draw a graph of their intensity continuously. Curves obtained resemble the curves obtained with the colorimetric densitometer. The area under the curves or the peak heights are a measure of the concentration. In this case the organically bound iodine (bound to protein) doesn't pass the cellophane tape and may be separately counted for the protein bound radioactive iodine on the sampling tape.

It is to be observed therefore, that the present invention provides for a method of placing a sample drop on a tape containing a reagent, which comprises the steps of placing the sample drop in a confined spot on a tape; turning the tape with the sample in a confined spot bottom side up; placing the tape with the reagent thereunder; placing a third porous tape between the tape containing the sample in the confined spot and the tape containing the reagent; and pressing down over the three tapes. The tapes can then be separated, and the tape containing the reagent, i.e., the test tape which now contains some of the sample can then be treated in a treating zone in accordance with the chemical result desired; and, can then pass through a reading zone and read. Advantageously, a non-porous backing, e.g., polyethylene can be placed or sprayed on the tape with the confined spot. The invention also provides for an apparatus in which there is an input zone, first, second and third tape containing means in said input zone; a dispensing station adapted to receive a tape coming from said first tape containing means; a reversing roller adapted to reverse a tape coming from said station; roller means adapted to receive and bring together said tapes; and a transfer and reaction zone through which said three tapes must pass while held together. Furthermore, the invention provides for the use of an elongated absorbent tape having rings spaced apart and aligned thereon of a water repellent material, preferably of a diameter of the order of about 15 mm. This tape may be made of paper and have a non-porous backing, e.g., polyethylene.

The invention further provides for a sample dispenser, comprising in combination, circular positioning means having an edge; holders along said edge; pivot means pivoting said holders to said edge; spring means retaining said holders horizontally; a bed in said holders adapted to receive a tube; cam means fixed at a point past which said circular positioning means must rotate adapted to engage said holders and bring them to a vertical position; and, blowing means over said point adapted to blow down into a holder containing a tube.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An automatic chemical analyzer comprising, in combination, tape moving means adapted to move a sample receiving tape adapted to receive a sample of a substance to be analyzed; a test tape to which the sample will be transferred and an intermediate porous tape through which the sample to be analyzed will have to pass in order to reach the test tape; an input zone including a sample receiving station; a transfer and reaction zone including means to bring the tapes together so that the tapes can travel under some pressure through the zone to transfer some of the sample on the sample receiving tape to the test tape through the intermediate tape; a tape separation zone, including means to separate and take up the sample receiving tape and the intermediate tape from the test tape; a treating zone having means to treat the test tape in accordance with the results desired; a reading zone including reading means to read the test tape; and, a terminal zone where the test tape will be disposed of.

2. A method of automatically analyzing substances, comprising the steps of assembling two absorbent and one porous tape of equal widths; forming confined spots on one of the porous tapes; placing a sample of the substance to be analyzed on the confined spot; reversing this tape so that the confined spot with the sample is face down; placing the tape which has received the sample and is face down over the intermediate porous tape and placing the third tape on the other side of the intermediate porous tape; pulling these three tapes under some pressure through a transfer and reaction zone so that some of the sample on the tape which has received the sample will be transferred to the third test tape through the intermediate porous tape; separating the three tapes; treating the third test tape which now contains some of the sample in a treating zone; and, passing said third test tape through a reading zone.

3. A process as claimed in claim 2, including the step of placing a reagent on the third test tape.

4. A process as claimed in claim 3, including the step of heating the third test tape in the treating zone.

5. A process as claimed in claim 3, including the step of placing a non-porous backing on the tape containing the confined spots.

6. An automatic chemical analyzer comprising, in combination, tape moving means adapted to move a sample receiving tape, a test tape and an intermediate tape; an input zone including a sample receiving station, tape holding means holding the tapes apart, and a reversing roller adapted to reverse the sample receiving tape; a transfer and reaction zone including means to bring the tapes together so that the tapes can travel under some pressure through the zone to transfer some of the sample to the test tape through the inermediate tape; a tape separation zone including means to separate and take up the sample receiving tape and the intermediate tape from the test tape; a treating zone including a chamber having heating means; a reading zone; including reading means to read the test tape; and, a terminal zone where the test tape ends its run.

7. An automatic chemical analyzer comprising in combination; a sample receiving tape; water repellent rings on said tape; a dispenser adapted to drop a sample on said tape; a reversing roller to turn said tape with the sample thereon bottom side up; a test tape to which said sample is to be transferred; an intermediate tape which is porous through which the sample is made to pass; a transfer and reaction zone in which the tapes are brought together including pressure means to press the tapes together; a tape separation zone where the test tape with some of the sample is separated from the other two tapes; a treating zone where said test tape is treated; and a reading zone, including reading means adapted to read the sample on said test tape.

8. In a device of the character described, an input zone including means for holding three separate tapes; a transfer and reaction zone including pressure means for bringing said tapes together; a tape separation zone including means to separate two of said tapes from the third tape; and, reading means to read said third tape after said third tape is separated from the other two tapes.

9. A device as claimed in claim 8 having a treating zone having means to treat said third tape before said tape is read by said reading means.

10. A device as claimed in claim 8 having a dispensing station in said input zone to position one of said three tapes which is separated from said third tape by the second tape so as to receive a sample thereon.

11. A device as claimed in claim 10 having a dispenser associated with said input zone to dispense a sample at said dispensing station.

12. In a device of the character described, an input zone, first, second and third tape containing means in said input zone; a dispensing station adapted to receive a tape coming from said first tape containing means; a reversing roller adapted to reverse a tape coming from said station; roller means adapted to receive and bring together said three tapes; and a transfer and reaction zone through which said three tapes must pass while held together.

13. A device as claimed in claim 12 having pressure means in said transfer and reaction zone to press on said tapes.

14. The method of distributing a sample drop on a tape uniformily without displacing a reagent contained thereon which reagent is soluble in the sample drop, comprising the steps of placing the sample drop on a tape; longitudinally aligning the reagent-containing tape with the sample-containing tape; the reagent being face to face with the sample drop; placing a third porous tape between the tape containing the sample and the tape containing the reagent; and, pressing down over the three tapes.

15. The method of distributing a sample drop on a tape uniformily without displacing a reagent contained thereon which reagent is soluble in the sample drop, comprising the steps of placing the sample drop on a tape having a confined spot; longitudinally aligning the reagent-containing tape with the sample-containing tape, the reagent being face to face with the sample drop in the confined spot; placing a third porous tape between the tape containing the sample and the tape containing the reagent; and, pressing down over the three tapes.

16. The method as claimed in claim 3, including the step of placing non-porous backing on the third test tape containing the reagent.

References Cited in the file of this patent

UNITED STATES PATENTS

| | | |
|---|---|---|
| 2,113,063 | Stryker | Apr. 5, 1938 |
| 2,129,754 | Yagoda | Sept. 13, 1938 |
| 2,408,058 | Gallagher | Sept. 24, 1946 |
| 2,602,729 | Curry | July 8, 1952 |
| 2,554,414 | McLendon | Dec. 16, 1958 |

UNITED STATES PATENT OFFICE

CERTIFICATE OF CORRECTION

Patent No. 3,036,893  May 29, 1962

Samuel Natelson

It is hereby certified that error appears in the above numbered patent requiring correction and that the said Letters Patent should read as corrected below.

Column 1, line 50, after "provide a" insert -- device --.

Signed and sealed this 29th day of October 1963.

(SEAL)
Attest:

ERNEST W. SWIDER
Attesting Officer

EDWIN L. REYNOLDS
Acting Commissioner of Patents